Nov. 11, 1952 S. J. BARTHA 2,617,886

MULTIVOLTAGE TRAIN TELEPHONE SYSTEM

Filed Dec. 30, 1948 3 Sheets-Sheet 1

INVENTOR.
STEPHAN J. BARTHA

BY Wm. Walter Owen.

ATTORNEY

INVENTOR.
STEPHAN J. BARTHA
BY Wm. Walter Owen
ATTORNEY

MULTIVOLTAGE TRAIN TELEPHONE SYSTEM

Filed Dec. 30, 1948 3 Sheets-Sheet 3

| TEL. NO. | SW. 106 SETTING |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 01 | 10 |
| 02 | 11 |
| 03 | 12 |
| 04 | 13 |
| 05 | 14 |
| 06 | 15 |
| 07 | 16 |
| 08 | 17 |
| 09 | 18 |
| 001 | 19 |
| 002 | 20 |
| 003 | 21 |
| 004 | 22 |

INVENTOR.
STEPHAN J. BARTHA

BY McWalter Owen.

ATTORNEY

Patented Nov. 11, 1952

2,617,886

UNITED STATES PATENT OFFICE 2,617,886

MULTIVOLTAGE TRAIN TELEPHONE SYSTEM

Stephan J. Bartha, Chicago, Ill., assignor to Automatic Electric Laboratories, Inc., Chicago, Ill., a corporation of Delaware Application December 30, 1948, Serial No. 68,349

9 Claims. (Cl. 179—16)

The present invention relates to telephone systems in general, and more particularly to telephone systems adapted for use in providing communication facilities between the cars of a railroad train or the like.

Telephone systems suitable for train service comprise essentially telephone stations conveniently located in the cars of the train, a line having a plurality of conductors throughout the train for interconnecting the telephone stations, and means for enabling passengers or porters to signal and converse with dining car, club car, and other service car attendants, for the purpose of ordering food and refreshments, and for requesting other services. Telephone systems previously designed for providing such services generally impose the restriction of requiring all cars included in the telephone system to have the same power supply voltage for operating the telephone system, and additionally, many of such telephone systems further require that the cars be retained in a fixed sequential order on all runs. Restrictions of these natures place a severe handicap upon train operation and "make-up," as cars are often equipped with power supplies of different voltages (for example, 32 volts, 64 volts, 110 volts), and there are numerous occasions where a particular car, such as a club car or dining car, cannot occupy the same relative position in the train make-up on different runs.

It is, therefore, a primary object of the present invention to provide an improved and efficient telephone system of the character described, wherein the cars comprising a train make-up can be equipped with power supplies of different voltages for operating the telephone system, and wherein any car can occupy any desired position in the train assembly with respect to the other cars.

Another object of the invention is to provide in a telephone system of the character described, new and novel means for completing calls from a telephone station in a car equipped with a power supply of one voltage to a telephone station in a car equipped with a power supply of different voltage.

A further object of the invention is to provide in a telephone system of the character described, new and novel circuit means for establishing the various telephone connections.

A still further object of the invention is the provision in a telephone system of the character described, of a new and novel method for quickly and conveniently changing the telephone number of a car without the unsoldering or rearranging of wired connections.

A feature of the invention resides in the novel arrangement whereby an individual control conductor is included in the multiple line interconnecting the telephone stations of the cars for each different power supply voltage in the telephone system.

Another feature of the invention concerns the novel manner in which a plurality of pulsing relays are utilized in each car for controlling the operation of the car telephone station selector.

Another feature of the invention relates to the improved pulsing arrangement wherein the power supply voltage of the car in which a telephone call is initiated is employed for operating one of the pulsing relays in the calling car and corresponding pulsing relays in the other cars of the telephone system.

A still further feature of the invention is the provision that the telephone station selector of each car is always operated from the related car power supply, under control of a pulsing relay operated from the power supply of a calling car which may be of the same voltage or of a different voltage.

Another feature of the invention concerns the new and novel manner in which any telephone station in any car can be readily restricted at any desired time from connecting with certain other telephone stations in the telephone system, without requiring unsoldering or re-arrangement of wired connections.

Other objects and features of the invention will become apparent from the following specification together with the accompanying drawings which show a proposed embodiment by way of example.

The invention is disclosed in three sheets of drawings comprising Figures 1, 2, 3, 4, 5, 6 and 7.

Referring to Figures 1 to 7, inclusive, a description of the equipment and arrangement of the various units will now be given.

*Telephone control apparatus for a car equipped with a 32-volt power supply*

Figure 1:
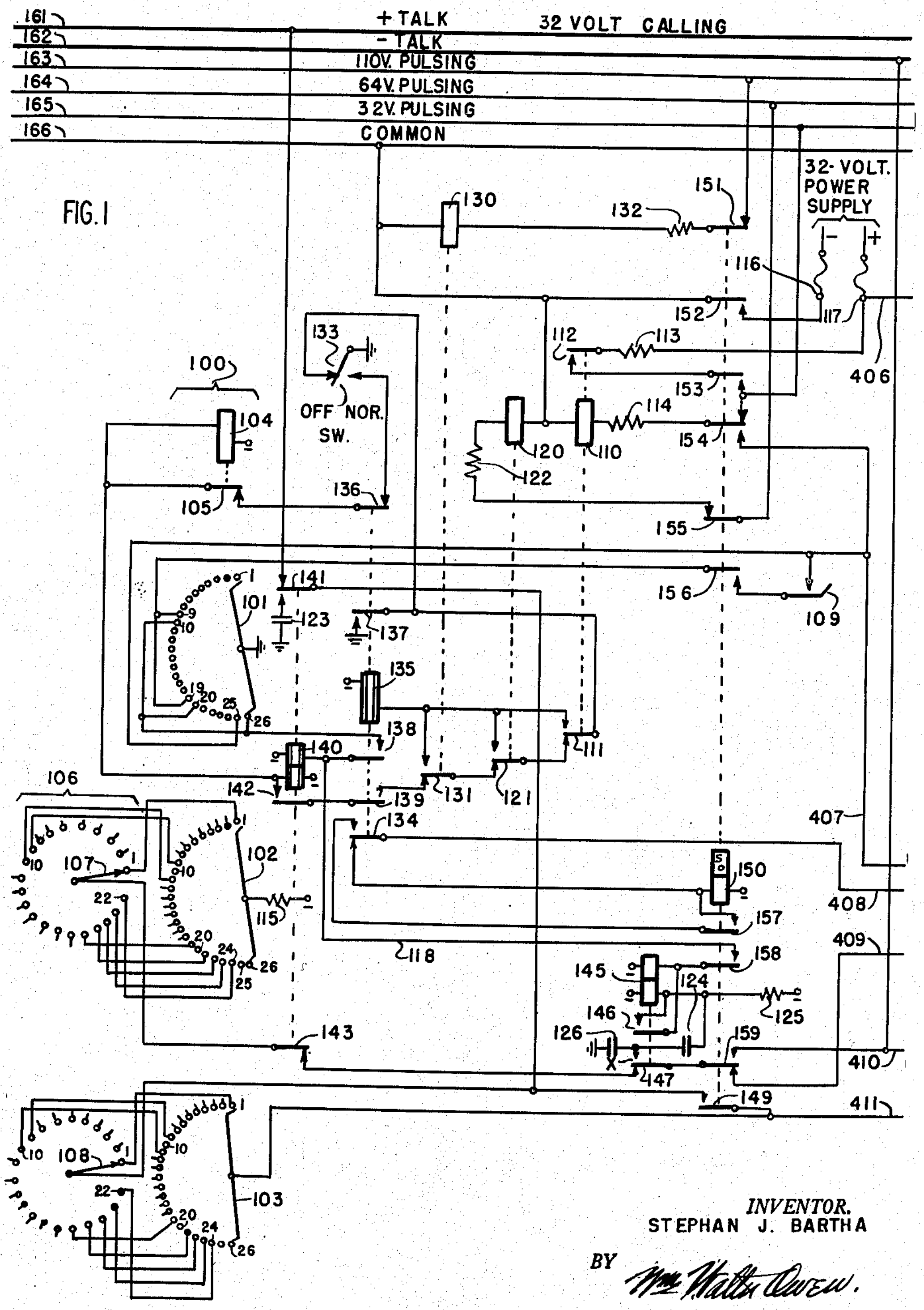
Figure 1 shows the complete control apparatus and wiring for a telephone station located in a car equipped with a 32-volt power supply.

As previously indicated, Figure 1 shows the complete control apparatus and wiring for a telephone station located in a car equipped with a 32-volt power supply. The apparatus includes the following described units:

A 26-point, three-level, rotary switch 100 of well known design having three wipers 101, 102 and 103 and associated levels of bank contacts, and a motor magnet 104 for causing the rotation of the wipers over the bank contacts. This rotary switch functions as a telephone station selector for selecting the telephone station of the related car in response to the operation of a dial at a calling telephone station in another car, and for completing the signal circuit of the called telephone station.

A 22-point, two-level, hand-operated rotary switch 106 (method of hand control not shown) having two wipers 107 and 108 and associated levels of contacts for providing means to quickly and conveniently change the telephone number of the related telephone station without the necessity of unsoldering or re-arranging wired connections.

A locking-type lever or push switch 109 for restricting the related telephone station from connecting with certain telephone stations in the train telephone system.

Three pulsing relays 110, 120 and 130 for controlling the stepping of the wipers of station selector 100. Relay 110 is arranged to operate on a power supply of 32 volts, relay 120 on a power supply of 64 volts, and relay 130 on a power supply of 110 volts.

Control relays 135, 140, 145 and 150 for performing certain circuit functions which are explained in a later section of the specification.

Various resistors and condensers associated with the pulsing and control relays for facilitating the operation of the relays in the various power supply voltage combinations.

It should be understood at this time that while station selector 100 and hand operated telephone number-changing switch 106 are disclosed as having certain bank contact capacities, these switches may equally as well have larger or smaller bank contact capacities, according to need or preference.

It should be further understood that although pulsing relays 110, 120 and 130 have been specified as operative on power supplies of 32 volts, 64 volts and 110 volts pressure respectively, the train telephone system is not limited to these three voltage requirements or to three different voltages, as any desired or required series of operating voltages may be employed.

*Telephone control apparatus for a car equipped with a 64-volt power supply*

Figures 2, 3:
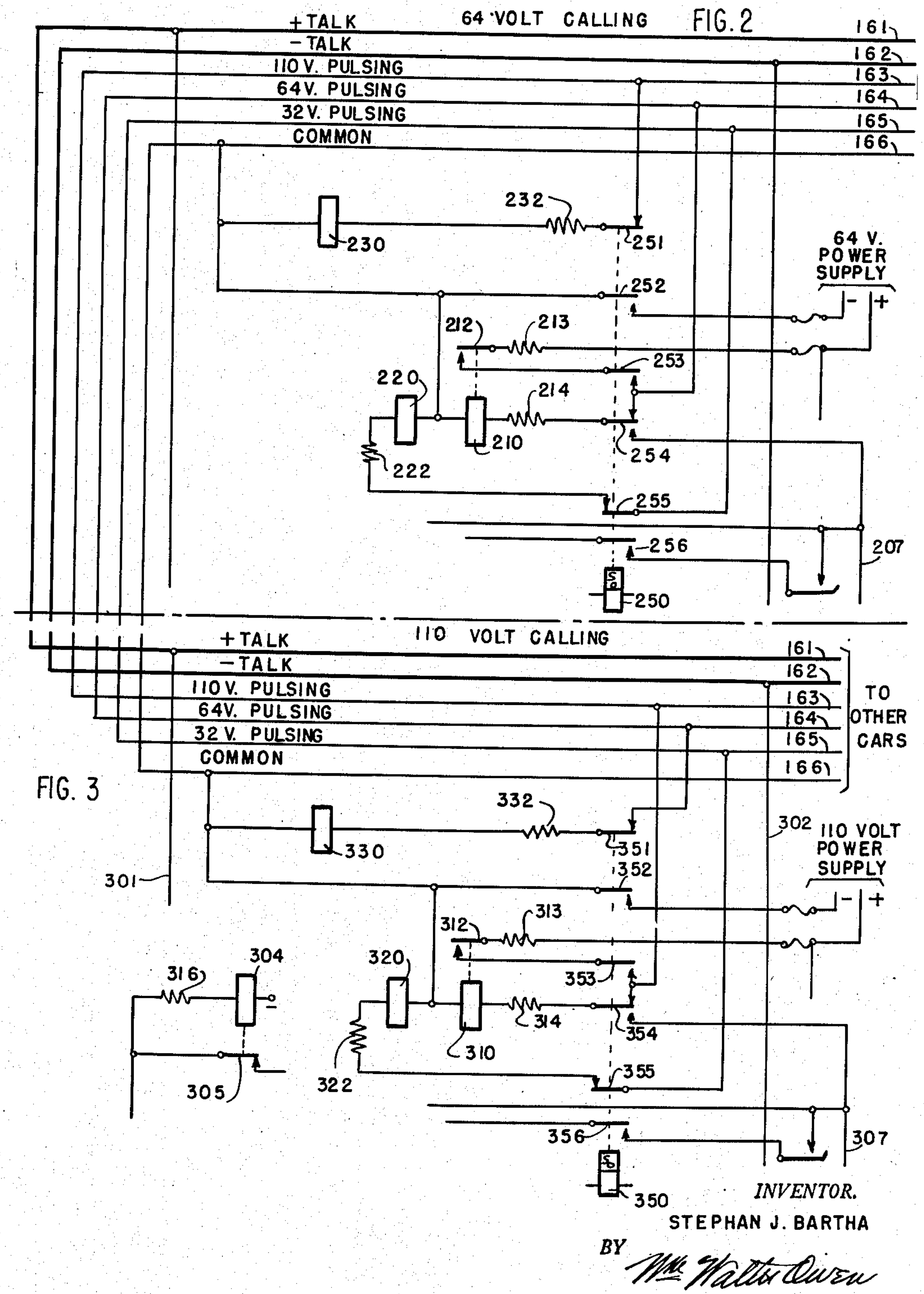
Figure 2 shows the changes required in the arrangement and wiring of the control apparatus shown in Figure 1 when the related car is equipped with a 64-volt power supply.
Figure 3 shows the changes required in the arrangement and wiring of the control apparatus shown in Figure 1 when the related car is equipped with a 110-volt power supply.

Figure 2 shows the changes required in the arrangement and wiring of the three pulsing relays of the control equipment when the related car has a 64-volt power supply. In this instance pulsing relay 210 (equivalent of pulsing relay 110) is arranged to operate on a power supply of 64 volts, pulsing relay 220 (equivalent of pulsing relay 120) on a power supply of 32 volts, and pulsing relay 230 (equivalent of pulsing relay 130) on a power supply of 110 volts.

In order to simplify the drawings, it is considered unnecessary to show the control equipment of Figure 2 in complete detail as reference can be made to Figure 1 for the details not included in Figure 2. It should be understood, however, that if the control equipment of Figure 2 was completely illustrated, all of the apparatus and wiring shown in Figure 1 would be included, except as modified by the specific changes now shown in Figure 2, and that the wipers of the number-changing switch corresponding to switch 106 would be resting on contacts other than the contacts #1 of the respective bank levels in order that the telephone station of Figure 2 would have a different telephone number.

*Telephone control apparatus for a car equipped with a 110-volt power supply*

Figure 3 shows the changes required in the arrangement and wiring of the three pulsing relays of the control equipment when the related car has a 110-volt power supply. In this instance, pulsing relay 310 (equivalent of pulsing relay 110) is arranged to operate on a power supply of 110 volts, pulsing relay 320 (equivalent of pulsing relay 120) on a power supply of 32 volts, and pulsing relay 330 (equivalent of pulsing relay 130) on a power supply of 64 volts.

Figure 3 also shows that since the operating voltage for motor magnet 304 is 110 volts, resistor 316 has been inserted in the circuit of motor magnet 304.

Remarks similar to those in the last paragraph of the preceding section of this specification apply to this section concerning the control equipment of Figure 3.

*Fixed station telephone with dial and signal*

Figures 4, 5, 6, 7:
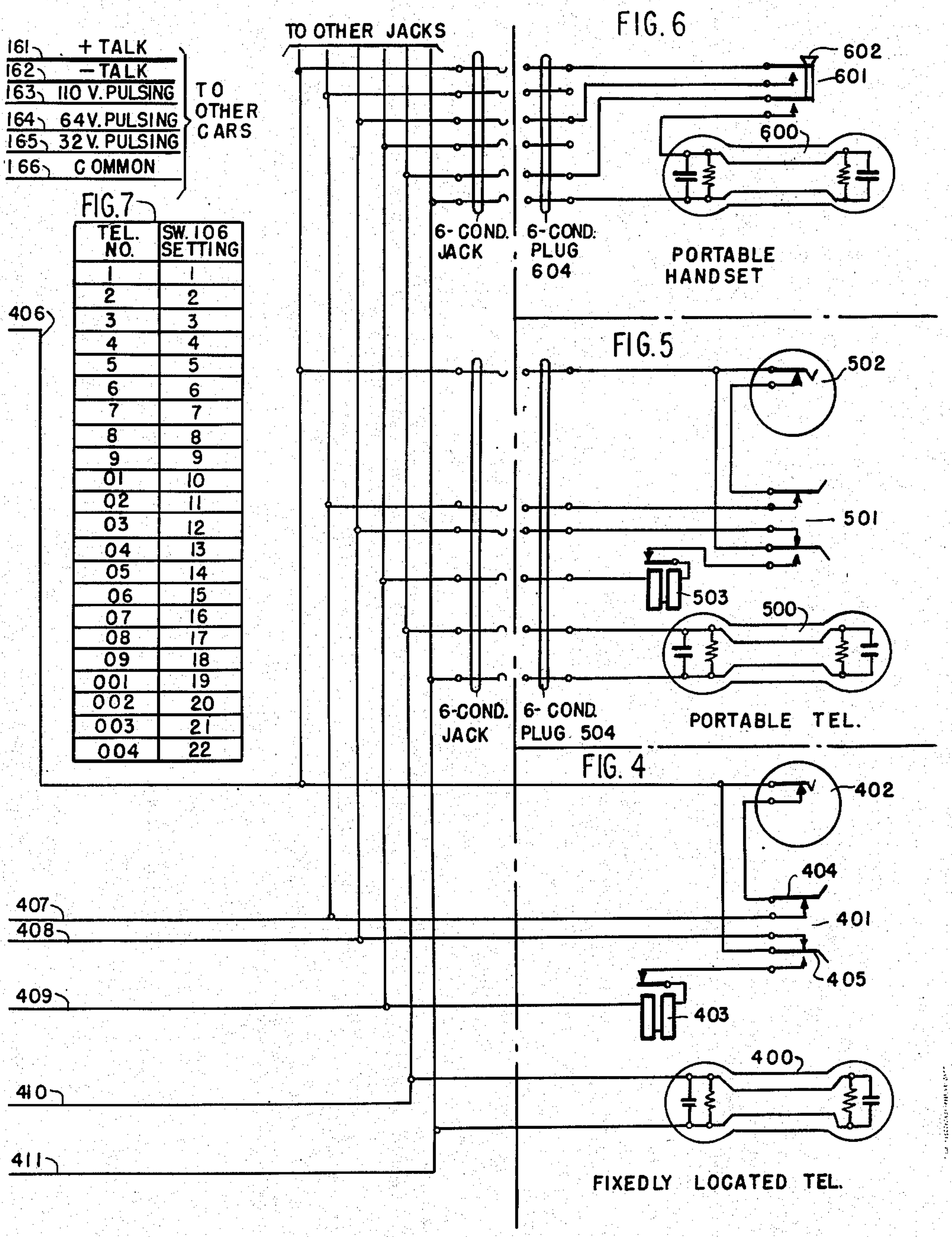
Figure 4 shows the arrangement and wiring of a telephone which can be located in any car and be permanently connected to the related control equipment, such as shown in Figures 1, 2 or 3, to serve as the regular calling and receiving telephone station for that particular car.
Figure 5 shows the arrangement and wiring of a plug-ending telephone equipped with a signal and a dial which can be plugged into a multiple jack in any car to serve as an auxiliary telephone station.
Figure 6 shows the arrangement and wiring of a plug-ending handset without signal or dial which can be plugged into a multiple jack in any car to serve as an auxiliary answering telephone.
Figure 7 shows a table, or chart, of 22 telephone station numbers and the related settings of the number-changing switch such as 106 in Figure 1.

The telephone equipment and wiring of the regular calling and receiving telephone station in each car included in the train telephone system is shown in Figure 4. The apparatus of the telephone consists of a handset 400 comprising a transmitter and a receiver, a cradle switch 401 located intermediate the cradle arms of the supporting members for handset 400 in the usual manner, a dial-actuated impulsing device 402, and a signal device in the form of a buzzer 403.

The transmitter and the receiver of handset 400 are preferably of the well-known self-powered (sound-powered) type, so that it is unnecessary to provide an auxiliary current source for voice frequency current transmission. A transmitter of the sound-powered type generally includes a diaphragm which is connected by means of a light connecting rod to an armature balanced between the poles of a powerful permanent magnet. When sound waves impinge upon the diaphragm, it vibrates in accordance with these waves to transmit the vibrations to the armature which, in turn, vibrates and sets up variations in the magnetic lines of force, both in number and direction. This causes an induced alternating voltage to be developed in the coil windings forming a part of the magnetic field which varies in amplitude and frequency in accordance with the amplitude and intensity of the input sound waves.

*Portable telephone with dial and signal*

Any car included in the train telephone system can be fitted with a multiple outlet jack, or jacks, connected to the car telephone system wiring in order that a portable telephone may be plugged into a jack to serve as an auxiliary telephone station. Such a plug-ending portable telephone is illustrated in Figure 5.

The portable telephone consists of a handset 500 comprising a transmitter and a receiver of the sound-powered type, a cradle switch 501, a dial-actuated impulsing device 502, and a signal buzzer 503, interconnected and terminating in a six-conductor plug 504.

*Portable handset without dial or signal*

Any car included in the train telephone system can be equipped with a handset terminating in a plug for use as an auxiliary answering telephone station. Such a handset is illustrated in Figure 6.

The portable handset consists of a handset 600 comprising a transmitter and a receiver of the sound-powered type, a talk-listen switch 601 located inside the handle of the handset and operative by means of a push button 602 protruding through the handle of the handset, and a four-conductor cord terminating in a six-conductor plug 604.

*Multiple train line*

The various regular calling and receiving telephone stations are interconnected by means of a multiple train line consisting of six conductors extending throughout the train. These conductors in each car are terminated in receptacles at the opposite ends of the car, and the adjacent receptacles of each two cars are coupled together by means of plug-ending flexible cable in well-known manner.

Two of the conductors (161—162) comprise the talking circuit, one conductor each (165, 164, 163) is respectively provided for the 32-volt, 64-volt and 110-volt pulsing circuits, and one conductor (166) is used as a common conductor in the three different voltage pulsing circuits.

*Power connections for train telephone system*

It should be understood at this time that while Figures 1, 2 and 3 each show a plurality of negative and positive power connections, such connections for each figure are preferably from the same power supply for that particular figure. For example, Figure 1 shows two terminals 116 and 117 connected to a 32-volt power supply and also a number of negative and positive power connections to the various apparatus units, but all of the negative and positive power connections for Figure 1 are from the same 32-volt power supply.

It should also be understood that in order to further simplify the drawings, spark quenching units comprising resistors and condensers have been omitted from the drawings. It should be further understood that an "X" contact shown in association with a relay armature in the drawings is a contact that makes or breaks before any other contacts of the particular relay are closed or opened, thus characterizing the relay as a two-step relay.

Having described the equipment and apparatus, a detail explanation of the operation of the train telephone system will now be given.

*Number of telephone stations in train telephone system*

The embodiment shown in the drawings provides for a maximum number of 22 regular calling and receiving telephone stations in the train telephone system. These calling and receiving telephone stations are usually located one in each car included in the train telephone system, although more than one of such telephone stations can be located in any car if so required. In addition, any car can be equipped with multiple jacks located at various points in the car and connected to the car telephone wiring so that a portable telephone or handset can be plugged into a multiple jack to serve as an auxiliary telephone.

It should be understood, however, that the invention is not limited to a maximum of 22 regular calling and receiving telephone stations, as a greater number of stations can be accommodated by providing larger bank capacity switches in the control equipment located in each car included in the train telephone system.

Figure 7 of the drawings provides a table, or chart, showing a preferred list of telephone numbers for the 22 regular calling and receiving telephone stations. The column at the left lists the telephone numbers, and the column at the right the associated settings of the hand-operated telephone number-changing switch (106 in Figure 1) in each car.

The contacts of the two levels of hand-operated number-changing switch 106 are wired to the contacts of the center and lower bank levels of station selector 100 in the manner shown in Figure 1. Contacts #1 of switch 106 are wired to the respective contacts #1 of selector 100, contacts #2 to the respective contacts #2, and so on until contacts #9 of switch 106 are wired to the respective contacts #9 of selector 100. Contacts #10 of switch 106 are not wired to contacts #10 of selector 100 but to contacts #11 of selector 100, leaving contacts #10 of selector 100 vacant. Contacts #11 of switch 106 are wired to contacts #12 of selector 100 and so on until contacts #18 of switch 106 are wired to contacts #19 of selector 100. Contacts #19 of switch 106 are not wired to contacts #20 of selector 100 but to contacts #21 of selector 100, leaving contacts #20 of selector 100 vacant. Contacts #20 of switch 106 are wired to contacts #22 of selector 100, contacts #21 to contacts #23, and contacts #22 to contacts #24. Wipers 107 and 108 of switch 106 are hand-operated to the respective contacts of desired telephone number, as indicated in the table shown in Figure 7. Unwired contacts #10 and #20 of the center and lower bank levels of selector 100 are home positions for the second and third digits of two-digit and three-digit telephone numbers.

*Changing telephone station numbers*

Should two or more cars have the related telephone number-changing switches (106 in Figure 1) on the same contacts at the time these cars are coupled into the train telephone system, thereby establishing duplicate telephone station numbers in the train telephone system, it is a simple matter to quickly and easily hand-operate one or more of the related telephone number-changing switches so that each car will have a different telephone station number. It will thus be seen that a novel means is provided for conveniently and rapidly changing the telephone station number of a car wythout unsoldering or re-arranging wired connections.

*Combinations of cars in train telephone system*

Since the drawings disclose a train telephone system in which one car (Figure 1) has a 32-volt power supply, a second car (Figure 2) a 64-volt power supply, and a third car (Figure 3) a 110-volt power supply, and since these cars are interconnected by means of a multiple train line which can be extended to other cars not shown on the drawings, it is apparent that the train telephone system can include any desired combination and number of cars having different voltage power supplies, up to the maximum permissible number of regular calling and receiving telephone stations.

It is also apparent that, since the train line is arranged on a multiple basis and there are no series circuits involved between the cars, any car can occupy any desired location in the train telephone system with respect to other cars regardless of the voltage of its power supply.

*Outgoing call from a car equipped with a 32-volt power supply*

Assuming now that a person in a car equipped with a 32-volt power supply (Figure 1) initiates a call for a car equipped with a 110-volt power supply (Figure 3), then the detail circuit operation is as follows:

The handset 400 (Figure 4) is lifted from its cradle thereby causing cradle switch 401 to assume the contact position shown in Figure 4. At armature spring 405 and closed contact, cradle switch 401 extends positive 32-volt potential to armature 134 of relay 135 (Figure 1) by way of terminal 117, conductor 406, armature spring 405 and closed contact, and conductor 408. Assuming further at this point in the operation that the multiple train line between the cars in the telephone system is unoccupied (idle), then relay 135 is in the normal unoperated position and the positive 32-volt potential is extended to the winding of line relay 150 through the resting contact associated with armature 134, causing line relay 150 to operate after a short interval.

At armatures 154, 155 and 151, respectively, relay 150 disconnects the windings of pulsing relays 110, 120 and 130 from the 32-volt, 64-volt and 110-volt pulsing conductors of the multiple train line. At armature 152 relay 150 extends negative 32-volt potential to the common train line conductor 166 as part of the pulsing circuit to the other cars in the train telephone system. At armatures 152 and 154, relay 150 completes the circuit of pulsing relay 110 from positive 32-volt potential on terminal 117, conductor 406, pulsing springs of dial 402, armature spring 404 and closed contact, conductor 407, armature 154 and working contact, resistor 114, winding of relay 110, armature 152 to negative 32-volt potential on terminal 116, causing relay 110 to operate.

At armature 111 and working contact, relay 110 completes a circuit to relay 135 from positive 32-volt potential by way of station selector off-normal armature spring 133 and resting contact to the winding of relay 135 and negative 32-volt potential, causing relay 135 to operate. At armature 112, relay 110 completes a multiple 32-volt pulsing circuit to pulsing relay 220 (Figure 2) in the car having a 64-volt power supply and to pulsing relay 320 (Figure 3) in the car having a 110-volt power supply, causing pulsing relays 220 and 230 to operate. The multiple 32-volt pulsing circuit may be traced from positive 32-volt potential on terminal 117 (Figure 1), resistor 113, armature 112, armature 153, 32-volt pulsing conductor 165 of the train line to Figures 2 and 3, from conductor 165 in Figure 2, armature 255, resistor 222, winding of pulsing relay 220 to negative 32-volt potential on common conductor 166 of the train line, and from conductor 165 in Figure 3, armature 355, resistor 322, winding of pulsing relay 320 to negative 32-volt potential on common conductor 166 of the train line.

At armature 137, relay 135 completes a multiple circuit to its winding independent of off-normal armature spring 133; at armature 134 and working contact, completes a locking circuit to relay 150 by way of armature 157; and at armature 138, completes circuits to relay 140 and dial tone relay 145. The circuit to relay 140 may be traced from positive 32-volt potential on wiper 101 of station selector 100, 26th contact of bank associated with wiper 101, armature 138, upper winding of relay 140 to negative 32-volt potential. Relay 140 operates over the circuit just traced, and connects condenser 123 to conductor 411 leading to handset 400 by way of armature 141 and working contact and armature 149. The circuit to dial tone relay 145 may be traced from positive 32-volt potential on wiper 101, 26th contact of bank associated with wiper 101, armature 138, conductor 118, armature 158, upper winding of relay 145 to negative 32-volt potential.

Dial tone relay 145, in operating, closes its "X" contact first, thereby connecting condenser 124 to conductor 410 leading to handset 400 by way of armature 147 and armature 159 and working contact. Next, dial tone relay 145 completes its operation and, at armature 146 extends the positive 32-volt potential on conductor 118 to its lower winding. The two windings of dial tone relay 145 are connected to oppose each other, and dial tone relay 145, therefore, now starts to restore. As it partially restores, the contact of armature 146 is opened thereby disabling the circuit through the lower winding, whereupon relay 145 ceases restoring and re-operates over the original circuit through the upper winding. The contact of armature 146 recloses to again complete the circuit through the lower winding, and the described cycle of relay 145 partially restoring and then re-operating is repeated over and over again in rapid sequence. Relay 145, therefore, operates in the manner of a buzzer and, through its operation, impresses between the talking conductors 410 and 411 an undulating voltage through condensers 123 and 124 which causes current to flow in the receiver of handset 400. This current flow in the receiver is of such a character that an audible signal is given to the calling person which he recognizes as an indication to start dialing the number of the wanted telephone station.

The calling person then dials the required telephone number which in this instance is assumed to be "3." The resulting interruptions of the pulsing springs of dial 402 is well-known manner cause pulsing relay 110 to correspondingly restore and re-operate three times. Pulsing relay 110 controls two independent pulsing circuits, one of which concerns the operation of the local station selector 100, and the other controls pulsing relays 220 (Figure 2) and 320 (Figure 3). A description of the operation of the local station selector 100 will be given in the immediately following paragraphs, after which the functioning of pulsing relays 220 and 320 will be explained.

Each time pulsing relay 110 restores responsive to the dialing of the digit "3," at armature 111 it opens the circuit to relay 135 and completes a multiple circuit to the lower winding of relay 140 and to the winding of motor magnet 104. Relay 135 is of the slow-to-release type and, therefore, remains operated during the pulse restoring periods of relay 110. The mentioned multiple circuit is traced from positive 32-volt potential at armature spring 133 of the selector off-normal switch and armature 137 in multiple for the first restoration of relay 110 and from armature 137 alone for the second and third restorations of relay 110, armature 111 and resting contact, armature 121 and resting contact, armature 131 and resting contact, armature 139, and armature 142 to the lower winding of relay 140 and to the winding of magnet 104.

Relay 140 operated previously through its upper winding and, being of the slow-to-release type, remains operated during the pulsing period of relay 110, the sustaining circuit for relay 140 between the pulses being through its lower winding. Magnet 104 operates with each pulse restoration of relay 110 to position its pawl in well-known manner preparatory to stepping wipers 101, 102 and 103 of station selector 100, and restores with each reoperation of relay 110 thereby to cause the wipers of selector 100 to be successively stepped from contacts #26 of their respective banks to contacts #3, also in well-known manner.

With the first stepping of the wipers of station selector 100, armature spring 133 of the selector off-normal switch operates to disconnect positive 32-volt potential from the circuit leading to the winding of relay 135, but relay 135 is sustained between the pulses and after the pulsing by the circuit through its armature 137.

As wiper 101 leaves its bank contact #26, the circuits through the upper windings of relay 140 and dial tone relay 145 are opened, causing relay 145 to restore fully and thereby eliminate the dial tone. As previously indicated, relay 140 is sustained by the circuit through its lower winding until the final (third) pulsing of relay 110 is completed, whereupon shortly thereafter relay 140 restores and disables the operating circuit of magnet 104 to prevent further possible accidental stepping of the station selector 100 wipers. Wipers 107 and 108 of number-changing switch 106 are resting on the respective contacts #1 (since the telephone number of the station shown in Figure 1 is the digit "1") and, therefore, no signalling circuit is established by station selector 100 operating its wipers to the contacts #3 of the related bank levels. Handset 400 is connected to the talk conductors of the multiple train line by way of conductor 410 to the negative talk conductor 162 of the train line, and by way of conductor 411, armature 149, armature 141 and resting contact to the positive talk conductor 161 of the train line, and the calling person now waits for the answer from the telephone station of the car represented by Figure 3.

Returning to the pulsing operation of relay 110 responsive to the dialing of the digit "3" by the calling person, the resulting operations of the pulsing relays 220 (Figure 2) and 320 (Figure 3) and related telephone station selectors (not shown but equivalent of selector 100 of Figure 1) will now be explained. The restorings and reoperations of armature 112 responsive to the dialing of the digit "3" correspondingly open and close the multiple pulsing circuits of relays 220 and 320 over the 32-volt pulsing conductor 165 and common conductor 166 of the train line three times. Pulsing relays 220 and 320 accordingly cause the related station selectors (not shown but the equivalent of selector 100) to connect with the contacts #3 of their respective banks, in a manner similar to that previously described for the operation of selector 100. The station selector controlled by pulsing relay 220 is operated from the 64-volt power supply of Figure 2, and the station selector controlled by pulsing relay 320 from the 100-volt power supply of Figure 3.

No signaling circuit is completed by the operation of the station selector controlled by pulsing relay 220 because the telephone number of the station represented by Figure 2 would be some other digit than the digit "3" (assumed to be the telephone number of the station represented by Figure 3) as, for example, the digit "2." The wipers of the number-changing switch of Figure 2 (not shown but the equivalent of wipers 107 and 108) are, therefore, resting on the respective contacts #2, and the wipers of the station selector controlled by relay 220 (not shown but the equivalent of wipers 102 and 103) are, consequently, connected to open contacts (contacts #3 of the related number-changing switch). The station selector controlled by pulsing relay 320, however, does complete the signalling circuit of the telephone station represented by Figure 3, in a manner similar to that described in a later section of this specification concerning the circuit details of an incoming call to the telephone station represented by Figure 1, to which description reference should be made for an understanding of the operation of the signalling circuit.

Assuming now that the telephone station of Figure 3 has been signalled and a person at that station has answered the call, then the telephone of Figure 3 station is connected to the positive and negative talk conductors 161 and 162 of the train line by way of conductors 301—302, and the calling and called persons converse over the train line. Should a person at the telephone station represented by Figure 2 attempt to connect with the train line while the train line is occupied with the call just described, the line relay of Figure 2 (not shown but equivalent of relay 150 of Figure 1) cannot operate and, consequently, the talking circuit of the telephone handset is open at an armature equivalent to armature 149. Privacy for the established conversation is thus assured. The manner in which a calling telephone is prevented from connecting with the train line while the train line is in prior use is described in a later paragraph of this section of the specification.

Upon the termination of the established conversation between the telephone stations of Figures 1 and 3, the connection is released when the calling person at the telephone station of Figure 1 returns the handset 400 to the cradle. Returning the handset 400 to the cradle causes cradle switch 401 to assume the contact position opposite to that shown in Figure 4, and, as a consequence, the circuit to relay 110 is opened at armature spring 404 and the circuit to relay 150 at armature spring 405, and both relays restore. At armature 111, relay 110 opens the circuit to relay 135, causing relay 135 to restore after a short interval. At armature 112, relay 110 opens the multiple holding circuit to relays 220 (Figure 2) and 320 (Figure 3), causing both relays to restore.

At armature 136, relay 135 completes a self-interrupted circuit to magnet 104 by way of armature spring 133 of the station selector off-normal switch, and magnet 104 "self-drives" wipers 101, 102 and 103 in well known manner to the respective contacts #26 of the related bank levels, whereupon the off-normal switch of station selector 100 restores to normal and, at armature spring 133, opens the self-interrupted circuit to magnet 104. Wipers 101, 102 and 103 are, therefore, arrested on the respective bank contacts #26. At armature 157, relay 150 opens its holding circuit: at armature 149, disconnects handset 400 from the train line talk circuit; at armatures 154, 155 and 151, respectively, reconnects the windings of pulsing relays 110, 120 and 130 to the 32-volt, 64-volt and 110-volt pulsing conductors of the train line; and, at armature 152, disconnects negative 32-volt potential from the common train line conductor 166. The apparatus and circuits of the control switch equipment of Figure 1 are now at normal.

The restorations of pulsing relays 220 (Figure 2) and 320, Figure 3) cause the release of the associated control equipments of Figures 2 and 3 in a manner similar to that just described for the release of the control equipment of Figure 1. The control equipments of Figures 1, 2 and 3 and the entire train line are now in the normal unoperated positions, and the train telephone system is available for another call.

Considering now the case where the train line is in prior use (busy) when a person at the telephone station of Figure 4 attempts to initiate a call, then relay 135 is already in the operated position as a result of the prior call. The circuit to line relay 150 is, therefore, open at armature 134 and, consequently, the attempted (second) call is ineffective. The absence of dial tone in handset 400 is an indication to the calling person that the train telephone system is already in use and that this call must be delayed until the train line becomes available. As soon as the prior connection is released, relay 135 restores in the manner previously described, thereby extending conductor 408 to the winding of relay 150, and a call can now be successfully originated at the telephone shown in Figure 4. Line relay 150 is of the slow-to-operate type in order that its operation is momentarily delayed to permit ample time for previously operated station selectors (100 in Figure 1) to "home" to the respective bank contacts #26.

*Outgoing call from a car equipped with a 64-volt power supply*

Should the calling station be located in a car equipped with a 64-volt power supply and the called station located in a car equipped with a 32-volt power supply, then the circuit operation is essentially the same as that described in the preceding section of this specification. The pulsing relays involved in this instance, however, are relay 210 of Figure 2, relay 330 of Figure 3, and relay 120 of Figure 1.

Relay 210 responds to the dial interruption over conductor 207 and, in addition to causing the stepping of the station selector of Figure 2 (not shown but the equivalent of selector 100), pulses relay 120 of Figure 1 and relay 330 of Figure 3 over the 64-volt pulsing circuit of the train line. In turn, relay 120 causes the stepping of station selector 100 over its 32-volt power supply to the bank contacts #1, thereby completing the signalling circuit of Figures 1 and 4. Relay 330 causes the stepping of the related station selector (not shown but the equivalent of selector 100) over its 110-volt power supply to the bank contacts #1, but does not complete the signalling circuit of Figure 3 (signalling circuit not shown but the equivalent of that shown in Figure 1), which is accessed through bank contacts #3.

*Outgoing call from a car equipped with a 110-volt power supply*

Should the calling station be located in a car equipped with a 110-volt power supply and the called station located in a car equipped with a 64-volt power supply, then the circuit operation is essentially the same as that described in the section titled "Outgoing Call From a Car Equipped With a 32-Volt Power Supply." The pulsing relays involved in this instance, however, are relay 310 of Figure 3, relay 230 of Figure 2, and relay 130 of Figure 1.

Relay 310 responds to the dial interruptions over conductor 307 and, in addition to causing the stepping of the station selector of Figure 3 (not shown but the equivalent of selector 100), pulses relay 230 of Figure 2 and relay 130 of Figure 1 over the 110-volt pulsing circuit of the train line. In turn, relay 230 causes the stepping of the related station selector (not shown but the equivalent of selector 100) over its 64-volt power supply to the bank contacts #2, thereby completing the signalling circuit of the telephone station represented by Figure 2 (signalling circuit not shown but the equivalent of that shown in Figure 1). Relay 130 causes the stepping of selector 100 over its 32-volt power supply to the bank contacts #2, but does not complete the signalling circuit of Figure 1 which is accessed through bank contacts #1.

*Power supplies to pulsing relays and related station selectors*

From the explanations given in the preceding three sections concerning the circuit operations of outgoing calls initiated in cars equipped with power supplies of 32 volts, 64-volts and 110 volts, respectively, it will be noted that the three pulsing relays in each instance are operated from the power supply of the car in which the calling station is located, the pulsing relay of the calling station being operated over a local circuit controlled by the dial of the calling station and the other two pulsing relays over a pulsing circuit of the multiple train line controlled by the pulsing relay of the calling station. It will be also noted that the station selectors controlled respectively by the three pulsing relays are each operated over a local circuit from the power supply of the car in which that particular station selector is located and, consequently, there is no interconnection of the power supplies of two or more cars. It will, therefore, be appreciated that the present invention provides new and novel means for isolating the different voltage power supplies of two or more cars, and that a vastly improved, efficient, and flexible train telephone system, free from the possibilities of undesirable power supply interferences or possible damage resulting therefrom, has been accomplished.

*Restricted service*

The train telephone system is so arranged that calls initiated at certain stations, such as stations located in sleeping cars, can only be extended to certain other stations, such as stations located in club and dining cars, whereas calls initiated at stations located in the club and dining cars, for example, can be extended to any other station in the system. Restriction of outgoing calls is accomplished at any station in a novel manner by installing a locking type lever or push key switch, (such as 109 in Figure 1), in the control equipment of such telephone station to be restricted, and placing the key switch in the operated (closed) position to make the restriction effective.

Referring now to Figure 1, the contacts #9 and #19 of the bank level associated with wiper 101 of station selector 100 are multiplied together and connected to armature 156 of line relay 150: the contact of armature 156 is connected to the armature spring of restriction key switch 109; and the contact of restriction key switch 109 is connected to conductor 407. With restriction key switch 109 in the operated (closed) position, it will be observed that when the dial 402 of the calling station represented by Figure 1 is operated, the circuit through key switch 109 is completed only when the single digit "9" or the first digit "0" of a two or three digit number is dialed. The circuit through key switch 109 is traced from positive 32-volt potential on wiper 101, bank contact #9, armature 156 (relay 150 operated responsive to the initiation of the call), key switch 109 to conductor 407. The pulsing contacts of dial 402 are shunted when positive potential is extended to conductor 407 through switch key 109, and pulsing relay 110 is, therefore, held continuously operated. As a consequence, the wipers of station selector 100 cannot be pulsed beyond the respective contacts #9.

Under the conditions outlined in the preceding paragraph, it is apparent that only the telephone stations having the single digit call numbers 2, 3, 4, 5, 6, 7, 8 and 9 are accessible to the station of Figure 1. Should the calling person at the station of Figure 1 dial a two-digit or a three-digit call number, the wipers of station selector 100 will be stepped to the respective bank contacts #9 and held on the contacts #9 because the pulsing contacts of dial 402 are shunted by the positive potential through key switch 109 in the manner just described when wiper 101 reaches its contact #9. Such an attempted two-digit or three-digit call is, therefore, ineffective. The station of Figure 1, however, is accessible to the stations restricted to the station of Figure 1 since the call number of the station of Figure 1 is the single digit "1".

In addition to the mentioned eight single-digit stations accessible to the station of Figure 1 when key switch 109 is in the closed position, the two-digit stations having the call numbers 01 through 09 can also be made available to the station of Figure 1. This is accomplished by connecting only contact #19 of the bank level associated with wiper 101 of station selector 100 to armature 156 of line relay 150, bank contact #9 in this instance not being multipled with bank contact #19. The circuit through key switch 109 is now completed only when the last digit "9" of the two-digit call number "09" or the second digit "0" of a three-digit call number is dialed at dial 402, and pulsing relay 110 is held continuously operated with wiper 101 resting on break contact #19. Under these conditions only the three-digit stations having the call numbers 001, 002, 003 and 004 are not accessible to the station of Figure 1.

*Incoming call to a car equipped with a 32-volt power supply*

Assuming now that a person in a car equipped, for instance, with a 64-volt power supply initiates a call for the telephone station associated with Figure 1 (32-volt power supply), then the circuit operation is as follows:

The calling person in the car represented by Figure 2 initiates the call and, after receiving dial tone, dials the digit "1" (telephone number of the station represented by Figure 1), in a similar manner to that described in the section of this specification titled "Outgoing Call From a Car Equipped With a 32-Volt Power Supply." In this instance, however, the calling station is associated with a car having a 64-volt power supply and, therefore, pulsing relay 210 in Figure 2, pulsing relay 120 in Figure 1, and pulsing relay 330 in Figure 3 respond to the dialing of the digit "1". The pulsing potential for relay 120 is traced from positive 64-volt potential on train line conductor 164 by way of the pulsing armature 212 through the resistor 122 and the winding of relay 120 to negative 64-volt potential on the train line common conductor 166. Relay 120 operates over this pulsing circuit.

At armature 121 and working contact, relay 120 completes a circuit to relay 135 from positive 32-volt potential by way of station selector off normal armature spring 133 and resting contact, armature 111 and resting contact, to the winding of relay 135 and negative 32-volt potential, causing relay 135 to operate. At armature 137, relay 135 completes a multiple circuit to its winding independent of off-normal armature spring 133: at armature 134, opens a point in the circuit to line relay 150 thereby to prevent relay 150 from operating when the called station answers; and, at armature 138, completes a circuit to relay 140 from positive 32-volt potential on wiper 101 of selector 100, 26th contact of bank associated with wiper 101, armature 138, upper winding of relay 140 to negative 32-volt potential, causing relay 140 to operate.

When pulsing relay 120 restores responsive to the dialing of the digit "1," at armature 121 it opens the circuit to relay 135 and completes a multiple circuit to the lower winding of relay 140 and to the winding of motor magnet 104. Relay 135 is of the slow-to-release type and, therefore, does not restore during the pulsing. The mentioned multiple circuit is traced from positive 32-volt potential at armature spring 133 of the selector off-normal switch and armature 137 in multiple, armature 111 and resting contact, armature 121 and resting contact, armature 131 and resting contact, armature 139, and armature 142 to the lower winding of relay 140 and to the winding of magnet 104.

Relay 140 operated previously through its upper winding and, being of the slow-to-release type, remains operated during the pulsing period of relay 120. Magnet 104 operates with the pulse restoration of relay 120 to position its pawl in well-known manner preparatory to stepping wipers 101, 102 and 103 of station selector 100, and restores after the pulsing to cause the wipers of selector 100 to be stepped from contacts #26 of the respective banks to contacts #1, also in well-known manner. It should be noted at this time that pulsing relay 120 is operated from the 64-volt power supply of Figure 2 on the train line and station selector 100 from the local 32-volt power supply of Figure 1 under the control of pulsing relay 120.

With the stepping of the wipers of station selector 100, armature spring 133 of the selector off-normal switch operates to disconnect positive 32-volt potential from the circuit leading to the winding of relay 135, but relay 135 does not restore during the pulsing and is sustained after the pulsing by the circuit through its armature 137. As wiper 101 leaves its contacts #26, the circuit through the upper winding of relay 140 is opened, whereupon shortly thereafter relay 140 restores and disables the operating circuit of magnet 104. Wipers 107 and 108 of number-changing switch 106 are resting on the respective contacts #1 (since the telephone number of the station shown in Figure 1 is the digit "1"), and a circuit is, therefore, completed from positive 32-volt potential at terminal 117, conductor 406, lower contact associated with armature spring 405 of cradle switch 401, interrupter armature of buzzer 403, windings of buzzer 403, conductor 409, armature 159 and resting contact, armature 147 and resting contact, armature 143, wiper 107, contact #1 of bank level associated with wiper 107, contact #1 of bank level associated with wiper 102, wiper 102, resistor 115 to negative 32-volt potential, causing buzzer 403 to operate as a calling signal.

Responsive to a person at the called station lifting handset 400 from the cradle, cradle switch 401 is caused to assume the contact position shown in Figure 4. The circuit for buzzer 403 is now open at armature spring 405, and handset 400 is connected to the talk conductors of the train line by way of conductor 410 to the negative talk conductor 162 of the train line, and by way of conductor 411, wiper 103, contact #1 of the bank level associated with wiper 103, contact #1 of the bank level associated with wiper 108, wiper 108, armature 141 and resting contact to the positive talk conductor 161 of the train line. The calling and called persons then converse over the train line, and upon the termination of the conversation, the connection is released in a similar manner to that described in the section titled "Outgoing Call From a Car Equipped With a 32-Volt Power Supply."

Considering now the case where an incoming call to the telephone station associated with Figure 1 (32-volt power supply) is initiated at the telephone station of a car equipped with 110-volt power supply, then the pulsing relays involved are relay 310 of Figure 3, relay 230 of Figure 2 and relay 130 of Figure 1. In this instance, relay 310 responds to the dial interruption over conductor 307 and, in addition to causing the stepping of the station selector of Figure 3 (not shown but equivalent of selector 100), pulses relay 230 of Figure 2 and relay 130 of Figure 1 over the 110-volt pulsing circuit of the train line. In turn, relay 230 causes the stepping of its related station selector (not shown) over its 64-volt power supply, and relay 130 causes the stepping of station selector 100 over its 32-volt power supply. In other respects, the details of this call are essentially the same as those just described for the case where the calling station is located in a car represented by Figure 2.

It should be understood that the calling telephone station can equally as well be located in a car equipped with a 32-volt power supply, in which case the operation of the control equipment of the calling station would be similar to that explained in the section titled "Outgoing Call From a Car Equipped With a 32-Volt Power Supply." The pulsing relays involved would then be relay 110 of the calling station, relay 110 of the called station, relay 220 of Figure 2, and relay 320 of Figure 3.

*Dialing telephone station call numbers*

Should the call number of a desired telephone station be less than 10, the station selectors in all cars of the train telephone system will be stepped to the equivalent contacts of the respective banks, upon the dialing of the call number.

Should the call number of a desired telephone station comprise two digits (see Figure 7), the first dialed digit "0" causes the station selectors to be stepped to the respective bank contacts #10 (which are not wired to contacts of the related telephone number-changing switches such as 106), and the second dialed digit then causes the station selectors to be stepped to the proper contacts of the group #11 to and including #19, whereupon the signalling circuit of the called station is completed in a similar manner to that explained in the section titled "Incoming Call to a Car Equipped With a 32-Volt Power Supply."

Should the call number of a desired telephone station comprise three digits, the first dialed digit (0) causes the station selectors to be stepped to the respective contacts #10 (which are not wired to contacts of the related telephone number-changing switches), the second dialed digit (also "0") causes the station selectors to be stepped to the contacts #20 (which are not wired to contacts of the related telephone number-changing switches), and the third (last) dialed digit causes the station selectors to be stepped to the proper contacts of the group #21 to and including #24, whereupon the signalling circuit of the called station is completed.

Contacts #10 and #20 of the banks associated with the wipers such as 101 are wired to the contacts of armatures such as 138 in order that the relays such as 140 are sustained through their respective upper windings as long as the station selector wipers are resting on either contacts #10 or contacts #20.

Should a calling person dial a number which would ordinarily step the wipers of the station selectors beyond contacts #24 of the respective banks and onto contacts of the first (single-digit) group of bank contacts, then as the wiper at the calling station equivalent of wiper 101 connects with its contact #25, positive potential is extended to the conductor equivalent of conductor 407 thereby to shunt the pulsing contacts of the calling dial. The pulsing relay equivalent to relay 110 is, therefore, held in the operated position and no further movement of the station selectors is possible at this time.

Having described the invention, what is considered new and is desired to have protected by Letters Patent is set forth in the following claims:

1. In a telephone system, the combination of a plurality of stations, each said station having a plurality of relays equal in number to the number of said stations, a line interconnecting said stations, said line having conductors equal in number to said number of relays in any one of said stations, means in each of said stations connecting each of said relays in each of said stations to a different one of said conductors of said line, and means controlled by any one of said stations for operating one of said relays in each of said other stations in unison over the corresponding connected conductor of said line.

2. In a telephone system as claimed in claim 1 wherein said last means includes a power source located at the controlling station for supplying power to operate said last one relay in each of said other stations.

3. In a telephone system, a plurality of stations each having a plurality of relays equal in number to the number of said stations, a power source at each of said stations, a line interconnecting said stations, said line having conductors equal in number to the number of said relays at one of said stations, means at each of said stations for connecting each of said relays at each of said stations to different ones of said conductors of said line, and means controlled by one of said stations for operating one of said relays in each of said other stations over the corresponding connected conductor of said line and for operating one of said relays at said one controlling station, said power source at said one controlling station included in said last means.

4. In a telephone system, three stations each having an individual power source, a line interconnecting said stations in a given order of relative positions, means at one of said stations for connecting its individual power source to said line, means at a second of said stations for connecting its individual power source to said line, means at the third one of said stations for connecting its individual power source to said line, a plurality of relays at each of said stations, means for operating certain of said relays from one of said power sources over said line, means for operating other of said relays from another of said power sources over said line, means for interconnecting said stations in a different order of positions, said operation of said certain relays and said operation of said other relays effective irrespective of the particular positional interconnection of said stations.

5. In a telephone system, a plurality of stations each including an impulsing device, a line interconnecting said stations, automatic switches individually associated with said stations, each of said switches having a predetermined operating position and a plurality of other operating positions individually corresponding to said stations, means responsive to the initiation of a call at a calling one of said stations for conditioning all said switches to respond to impulses transmitted from said calling station, means responsive to impulses transmitted from said impulsing device at said calling station for causing all said switches to operate to the respective one positions corresponding to a called one of said stations or to said respective predetermined positions depending upon the number of impulses transmitted from said impulsing device at said calling station, means responsive to the operation of the switch at said calling station to its said predetermined position for rendering all said switches non-responsive to further transmitted impulses whereby calls from said calling station to certain of said other stations are prevented, and a manually operative device at said calling station for rendering said last mentioned means ineffective thereby to permit calls from said calling station to said certain other stations.

6. In a telephone system, two stations, a trunk line interconnecting said stations, an impulse-responsive switch, an impulsing device and a relay at one of said stations, an impulse-responsive switch at said other station, said switches each having a predetermined operating position and a plurality of other operating positions beyond said predetermined position, means responsive to the initiation of a call at said one station for operating said relay, means responsive to the operation of said impulsing device at said one station for pulsing said operated relay, means responsive to said pulsing of said relay for correspondingly pulsing said switch at said one station, means responsive to said pulsing of said relay for correspondingly pulsing said switch at said other station over said trunk line, means responsive to said switch at said one station advancing to its said predetermined position for rendering said impulsing device at said one station thereupon ineffective to prevent further advancing of both said switches when the dialed digit has a value corresponding to one of said other positions which are beyond said predetermined position, and means at said one station controllable at will for rendering said last mentioned means ineffective, thereby to permit both said switches to advance beyond said predetermined positions when the dialed digit has a value corresponding to one of said other positions.

7. In a signalling system, the combination with a station having a signal, of a switch having a rotatable connecting brush and a plurality of terminals accessible to said brush, a selector having a wiper and a plurality of bank contacts accessible to said wiper, said terminals of said switch and said bank contacts of said selector being interconnected, means connecting said signal to said brush of said switch, manually controlled means for quickly and conveniently rotating said brush of said switch into contact with any desired terminal of said switch to thereby connect said signal to any one of the bank contacts of said selector corresponding to the terminal of said switch upon which said brush of said switch is now resting, said connection of said signal being accomplished solely by said manually actuated movement of said brush of said switch without unsoldering wires or changing jumpers, means responsive to received impulses for pulsing said selector to cause said wiper of said selector to select said one bank contact of said selector corresponding to said one terminal of said switch, and means responsive to said selection of said one bank contact of said selector for completing an operating circuit to said signal, whereby said signal may be operated in response to any desired number of received impulses dependent on the position of said brush.

8. In a telephone system, two stations, one of said stations having a selector, signalling means, a first relay and a second relay, said other station having a selector and signalling means, a line having a plurality of conductors interconnecting said stations, said second relay being connected to one of said conductors of said line and controllable thereover by said other station, means responsive to the initiation of a call at said one station for disconnecting said second relay from said one conductor of said line to prevent said other station from operating said second relay, means responsive to said initiation of said call for operating said first relay, means controlled by said one station for alternately restoring and re-operating said first relay, means responsive to said restorations and re-operations of said first relay for correspondingly stepping said selector of said one station to prevent the operation of said signalling means of said one station, means including another conductor of said line responsive to said restorations and re-operations of said first relay for correspondingly stepping said selector of said other station to cause the operation of said signalling means of said other station, means responsive to the initiation of a call at said station at a time said one station is idle for operating said second relay over said one conductor of said line, means thereafter controlled by said other station for alternately restoring and re-operating said second relay, and means responsive to said restorations and re-operations of said second relay for correspondingly stepping said selector of said one station to cause the operation of said signalling means of said one station.

9. In a telephone system, two stations, one of said stations having a selector, signalling means, an impulsing device, a first relay, a second relay and a third relay, said other station having a selector, signalling means and an impulsing device, a line having a plurality of conductors interconnecting said stations, said third relay being connected to one of said conductors of said line and controllable thereover by said other station, means responsive to a call at said one station for operating said first relay to disconnect said third relay from said one conductor of said line thereby to prevent said other station from operating said third relay, means responsive to said operation of said first relay for operating said second relay, means responsive to the operation of said impulsing device at said one station for alternately restoring and re-operating said second relay according to the value of the dialed digit, means responsive to said restorations and re-operations of said second relay for correspondingly stepping said selector of said one station to prevent the operation of said signalling means of said one station, means including another conductor of said line responsive to said restorations and re-operations of said second relay for correspondingly stepping said selector of said other station to cause the operation of said signalling means of said other station, means responsive to the initiation of a call at said other station at a time said first relay is in its normal unoperated position for operating said third relay over said one conductor of said line, means thereafter responsive to the operation of said impulsing device at said other station for alternately restoring and re-operating said third relay according to the value of the dialed digit, and means responsive to said restorations and re-operations of said third relay for correspondingly stepping said selector of said one station to cause said signalling means of said one station to operate.

STEPHAN J. BARTHA.

REFERENCES CITED

The following references are of record in the file of this patent:

UNITED STATES PATENTS

| Number | Name | Date |
|---|---|---|
| 1,200,811 | Clement | Oct. 10, 1916 |
| 1,727,133 | Richardson | Sept. 3, 1929 |
| 1,841,733 | Hershey | Jan. 19, 1932 |
| 1,969,075 | Henry | Aug. 7, 1934 |
| 1,992,389 | Moser | Feb. 26, 1935 |
| 2,183,839 | Jauch | Dec. 19, 1939 |